United States Patent [19]

Kuster et al.

[11] 4,195,194

[45] Mar. 25, 1980

[54] JUNCTION BOX

[75] Inventors: Charles W. Kuster, Mt. Joy; Floyd H. Renshaw, Hershey, both of Pa.

[73] Assignee: AMP Incorporated, Harrisburg, Pa.

[21] Appl. No.: 908,295

[22] Filed: May 22, 1978

[51] Int. Cl.² .............................................. H01R 9/08
[52] U.S. Cl. ..................................... 174/59; 339/19; 339/97 R; 339/198 R
[58] Field of Search ............... 174/59, 60; 339/198 R, 339/18 R, 18 B, 18 P, 19, 97 R, 105

[56] References Cited

U.S. PATENT DOCUMENTS

| | | | |
|---|---|---|---|
| 1,659,303 | 2/1928 | Rovere | 174/59 X |
| 2,360,304 | 10/1944 | McLoughlin et al. | 174/59 X |
| 3,164,709 | 1/1965 | Gentile | 339/198 R X |
| 3,579,177 | 5/1971 | Lawlor | 339/198 R |
| 3,617,612 | 11/1971 | Patton | 174/59 |
| 3,813,642 | 5/1974 | Fisher | 339/198 R |
| 3,997,234 | 12/1976 | Worman | 339/105 |
| 4,074,929 | 2/1978 | Krider | 339/97 R |

Primary Examiner—B. A. Reynolds
Assistant Examiner—D. A. Tone
Attorney, Agent, or Firm—Allan B. Osborne

[57] ABSTRACT

The invention relates to a junction box having a plurality of terminals adapted to complete electrical circuits. More particularly, the invention includes an insulating housing with an attached cover and wire-in-slot terminals positioned in separate bays along the floor of the housing. Facing terminals are closed by a contact screw positioned therein between.

3 Claims, 5 Drawing Figures

JUNCTION BOX

BACKGROUND OF THE INVENTION

1. Field of the Invention

This invention relates to devices characterized as barrier blocks, junction blocks and terminal blocks. In each instance, the device includes an insulating support member on which is mounted terminals adapted in one manner or the other to connect or common two or more electrical wires.

2. Prior Art

Prior art devices include the terminal block assembly disclosed in U.S. Pat. Re 25,446. In the main through assemblies include a block of insulating material having separate or insulated cells or cavities in which are contained a conductive commoning bar with machine screws at either end. Wires are commoned by being secured to the bar by the screws.

SUMMARY OF THE PRESENT INVENTION

The present invention provides a junction box having a centrally disposed structure comprising a plurality of terminal containing cavities. A common means interconnects facing terminals.

BRIEF DESCRIPTION OF THE DRAWINGS

FIG. 4 shows the working tip of a wire insertion tool; and

FIG. 5 is a perspective view of an alternate terminal.

DESCRIPTION OF THE PREFERRED EMBODIMENT

Figure 1:
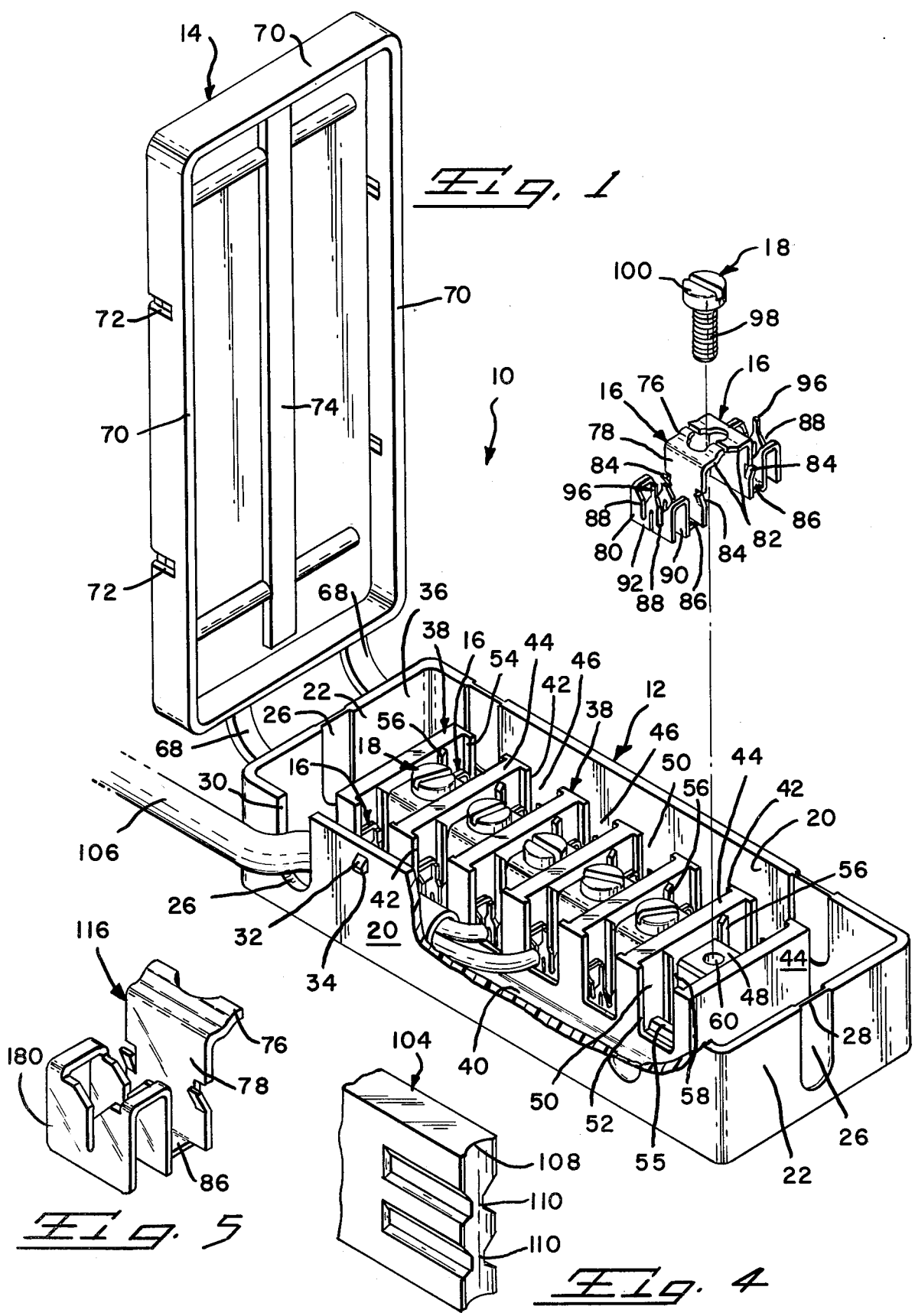
FIG. 1 is a perspective view of the junction box of the present invention with a pair of terminals exploded out therefrom.

Junction box 10 shown in FIG. 1 consists of a base member 12, hinged cover 14, terminals 16 and commoning means 18. The base member 12 and hinged cover 14 are molded or otherwise made from insulating material such as nylon.

Base member 12 is an elongated, open-box structure with side walls 20 and end walls 22. Floor 24 is common to the four vertical walls.

Each side wall preferably has two wire access sites 26. These sites initially are covered by a thin piece of material 28 which when removed provides a U-shaped opening 30 as shown in one side wall in FIG. 1. Each end wall 22 also has at least one access site 26.

Each side wall 20 has two, spaced apart ears 32 projecting outwardly from the exterior surface. Each ear has a downwardly facing shoulder 34.

The four walls and floor define an open compartment 36. An elongated box-like structure 38 is positioned in compartment 36 with a track or wire-receiving channel 40 (FIG. 2) between it and the four external walls 20 and 22.

Structure 38 has two side walls 42, and a plurality of transverse walls 44. Each adjacent pair of transverse walls 44 define a cell 46 extending between the two side walls 42. Each cell 46 is sub-divided by a vertical block 48 into two cavities 50. Openings 52 in side walls 42 lead to each cavity. The side walls around each opening provides inwardly facing flanges 54. As the cross-section drawing in FIG. 2 shows, cavities 50 are above the level of channel 40.

The floor of each cavity has a boss 55 extending between adjacent walls 44.

Vertical ribs 56 on transverse walls 44 are positioned adjacent blocks 48 to define a narrow channel 58 (FIG. 2) therein between.

Figure 2:
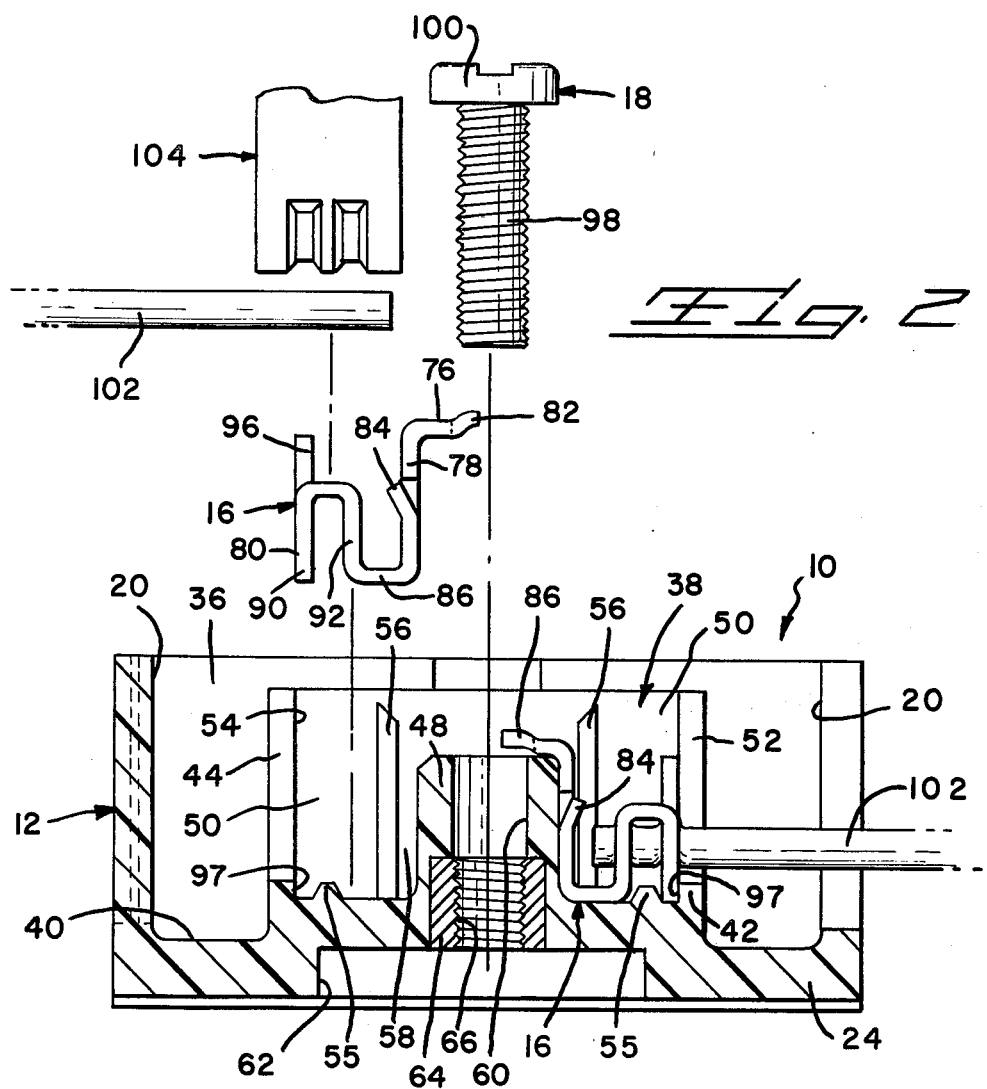
FIG. 2 is a cross-sectional view along the longitudinal axis of the junction box of FIG. 1 showing one terminal in place with a wire terminated, a second terminal and commoning member exploded out therefrom and the tip of the terminating tool.

Blocks 48, as better seen in FIG. 2, have a vertical passage 60 extending from the upper surface through to recesses 62 in the bottom surface of floor 24. A separate recess underlies each block 48. The lower portion of passages 60 are counterbored to receive and retain an insert 64 containing a threaded passage 66. The two passages, 60 and 66 are in registration with each other.

Figure 3:
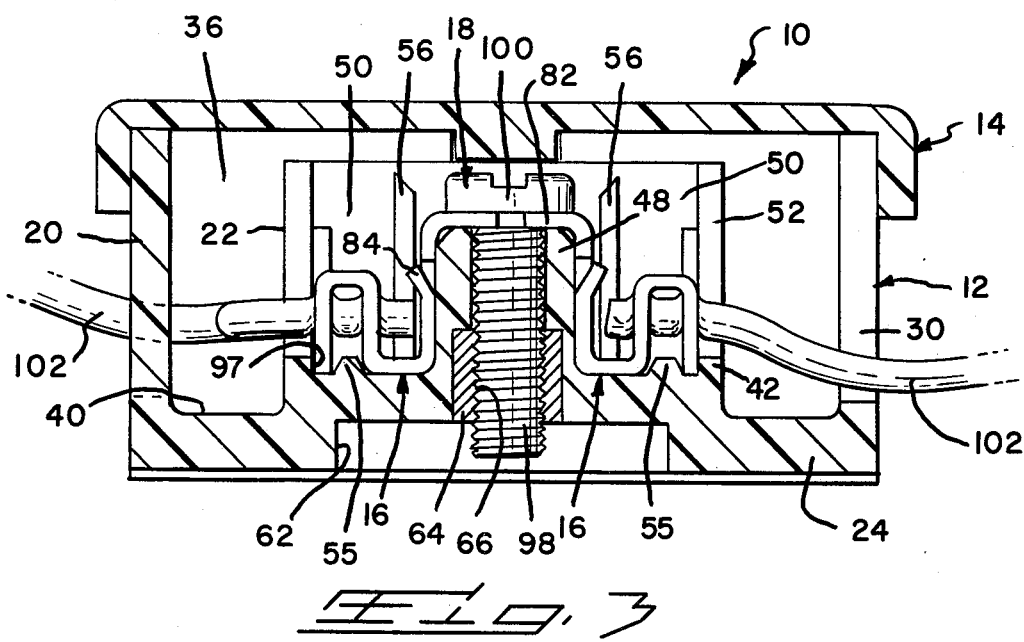
FIG. 3 is a cross-sectional view along the longitudinal axis of the junction box of FIG. 1 showing a pair of wires terminated and commoned.

Cover 14 is joined to base member 12 by a pair of hinges 68. The cover itself has depending skirts 70 that extend partially downwardly over the walls of base member 12 in the closed condition (FIG. 3). The skirts along the sides each have two holes 72. The cover is held onto the base member 12 by ears 32 protruding through the holes with shoulders 34 abutting the edge of the holes.

A bar 74 depends from the inside of cover 14 and extends along most of the length thereof.

Terminals 16 are stamped and formed from a conductive material such as brass with a tin plating. Other suitable conductive materials may also be used. Each terminal consists generally of a spring section 76, a retaining section 78 and a terminating section 80. With reference to both FIGS. 1 and 2, spring section 76 can be seen as being U-shaped with the legs 82 bent or curved upwardly. Retaining section 78 extends downwardly from the spring section and has two tines 84 blanked out to point obliquely upwardly. The tines are located along the two sides of the section.

Terminating section 80 is connected to retaining section 78 by a flat strip 86. The strap is not as wide as the retaining and terminating sections as can be seen in FIG. 1. The terminating section of the terminals 16 is adapted to receive and terminate two separate wires.

The terminating section is, in profile, (FIG. 2) an inverted U. Two parallel, spaced apart slots 88 are cut through the bight of the U and down the front and rear legs, 90 and 92 respectively. The geometry of each slot is that of being wide across the bight and narrowing down the legs so that as a wire is pushed in, the edges cut through the insulation and make substantial contact with the underlying conductor.

In forming terminating section 80, the bight material between the two slots is cut adjacent front leg 90 and bent to project vertically upwardly from the rear leg 92. This material provides a tab 96 for test probes.

Terminals 16 are loaded into cavities 50 with the edges of the retaining section in channels 58. The tines 84 dig into ribs 56 (as shown in the right hand cavity in FIG. 2) to retain the terminals in the cavities. Spring sections 76 overlie a part of block 48 with the legs 82 thereon partially encircling but preferrably not covering any part of passage 60. The rear leg 92 of the terminating section abutt the inside surface of side walls 42 while its free end enters a channel 97 formed between boss 55 and side wall 42.

The boss prevents leg 92 from moving in towards leg 90 and the side wall 42 prevents it from moving outwardly.

Commoning means 18 may be a machine screw of conductive material having a threaded shank 98 and slotted head 100. The shank is threadedly received in passage 66 of insert 64 positioned in passage 60.

FIG. 2 shows a terminal 16 positioned in the right-hand cavity of a cell 46. A wire 102 has been terminated in the terminating section 80. On the left hand side a terminal is shown prior to being placed in the left-hand cavity. Also shown is a wire 102 and an insertion tool 104 useful in pushing wire 102 into the termination section after the terminal has been loaded into the cavity.

FIG. 3 shows an assembled junction box 10. Terminals 16 have been positioned in the cavities and wires 102 inserted therein. Although FIG. 3 shows single wires coming into the box through openings 30 in access sites 26, FIG. 1 illustrates how a cable 106, containing several wires 102, may be brought into the box and laid along channel 40. The several individual wires 102 are terminated in several cells 46 as required.

Returning to FIG. 3, commoning means 18 has been threaded into insert 64 so that its head contacts both terminal's spring sections 76 to thereby complete a circuit from one terminal to the other. The legs 82, being formed in an upward or convex shape (FIG. 2), maintain pressure against the head 100 to prevent the screw from vibrating out and causing a break in the circuit.

FIG. 3 also shows cover 14 positioned onto the base 12. In the event one or more commoning means have not been threaded into the insert's passage, bar 74 would have prevented the closing and latching of the cover.

FIG. 4 shows the working tip of insertion tool 104. The extreme tip is curved or rounded normal to the length to provide a wire trough 108. The width of the tip is narrowed at two locations designated by reference numeral 110. The width of these reentrants equates to the width of slots 88 in legs 90 and 92. The distance between the reentrants equates to the distance between legs 90 and 92. Termination using the tool requires two simple steps. First the wire is laid into the wide portion of slot 88 across the bight. The tool is then placed on top of the wire with the narrowed widths 110 in registration with legs 90 and 92. Force on the tool pushes the wire down the slots in the two legs whereby the insulation is cut and contact made with the underlying conductor. The curvature of the tool tip; i.e., trough 108, confines the wire to aid in the insertion.

FIG. 5 illustrates another embodiment of a terminal. This terminal, indicated by reference numeral 116 has an identically structured spring section 76, retaining section 78 and connecting strip 86. Only the terminating section, indicated in FIG. 5 by reference numeral 180, differs. The major difference is that the section will accept only one wire. Thus with termination section 80 two wires could be commoned simply by being inserted therein; centra commoning of two wires with respect to terminal 116 is across a cell container two such terminals. A minor differance is the absence of a test tab 96. The junction box 10 accepting terminals 116, of course, would differ in that cavities 50 would be narrower.

Although not shown, access sites 26 may also be provided in the base through floor 24.

With respect to access sites, it should be noted that preferrably none are in direct alignment with the cells. Accordingly, cables or wires entering into compartment 36 must make at least one bend before being terminated. This provides a strain relief for such terminated wires.

Junction box 10 may have holes (not shown) through its floor 24 to enable it to be mounted by screws or the like. In the alternative, the bottom of the box may have a strip of adhesive thereon for mounting in that manner.

Often times it is desirable to identify the circuits of the several wires terminated in box 10. Labels (not shown) may be placed inside cover 14 for this purpose.

The foregoing detailed description has been given for clearness of understanding only, and no unnecessary limitations should be understood therefrom, as some modifications will be obvious to those skilled in the art.

What is claimed is:

1. A junction box, comprising:
   a. a base member of insulating material having a floor and upstanding walls to define a compartment;
   b. a structure within the compartment consisting of a plurality of vertical walls which define a plurality of cells, each cell being electrically isolated from another,
   c. barrier means positioned in each cell adapted to divide the cell into two cavities, further, each of said vertical walls having a vertical rib near said barrier means to define a vertical channel therebetween;
   d. a plurality of conductive terminals having a U-shaped spring section at one end and a terminating section at another end, said terminals being positioned in the cavities with the legs of the U-shaped spring section extending onto the barrier means; and
   e. commoning means adapted to be removably biased against the legs of the two spring sections overlying the barrier means in each cell whereby
   the two terminals therein may be selectively electrically joined.

2. The junction box of claim 1 wherein said terminals include a vertical section between the spring section and terminating section with the edges of said vertical section being positioned in the vertical channel.

3. The terminals of claim 2 wherein the edges of the vertical section includes tines projecting obliquely upwardly, said tines adapted to dig into the vertical ribs to retain the terminals in the cavities.

* * * * *